United States Patent Office 3,522,663
Patented Aug. 4, 1970

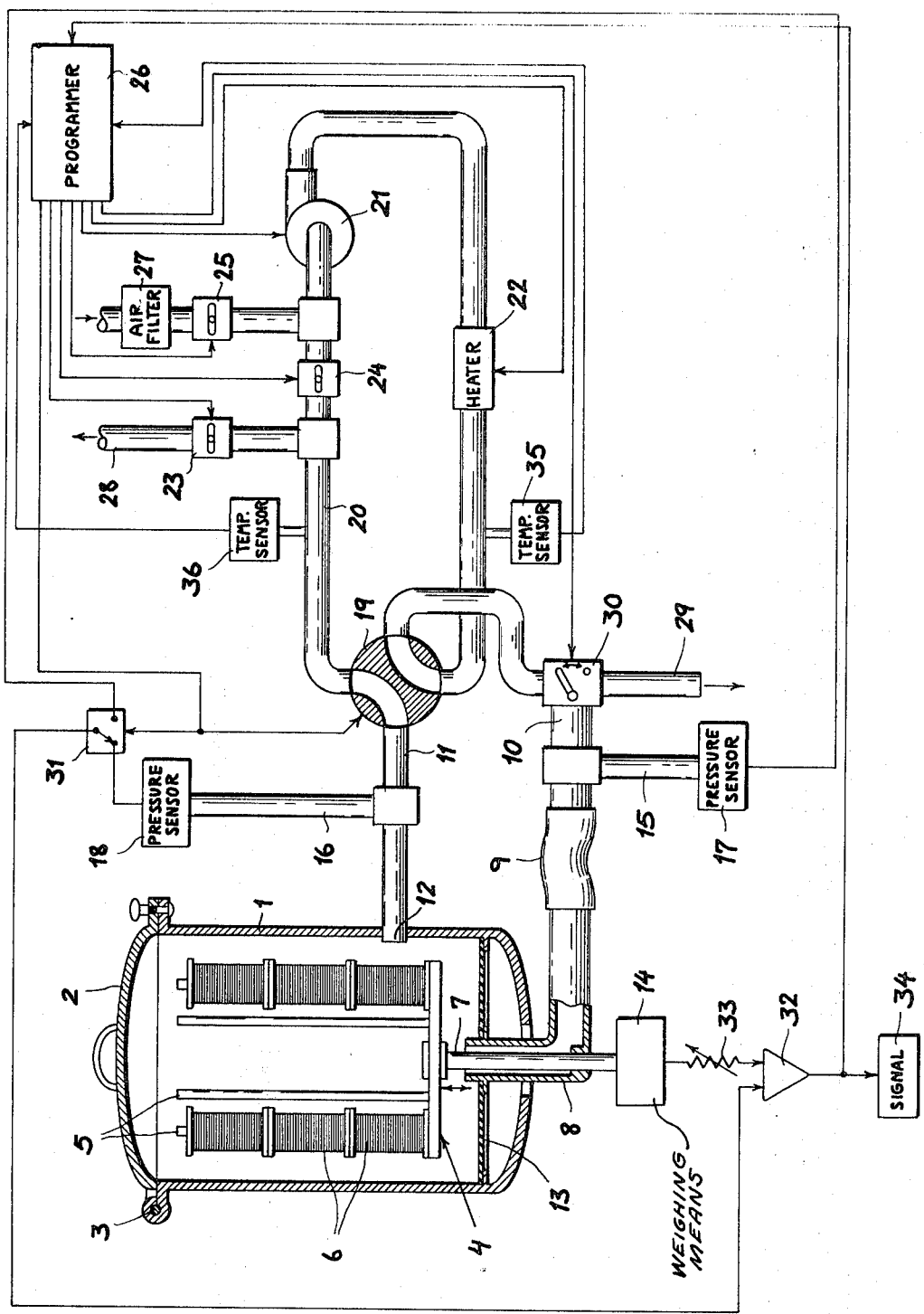

3,522,663
APPARATUS FOR DRYING WET-TREATED GOODS
Alfons Grimmelt, Coesfeld, and Josef Heim, Bensberg-Refrath, Germany, assignors to Jagri G.m.b.H., Maschinen und Apparatebau, Gescher, Westphalia, Germany, a corporation of Germany
Filed Apr. 23, 1968, Ser. No. 723,413
Int. Cl. F26b *21/00*
U.S. Cl. 34—54        7 Claims

ABSTRACT OF THE DISCLOSURE

Wet-treated goods, such as spools of yarn subjected to a dyeing process, are mounted in a drying chamber on a support bearing upon a sensitive weighing device, such as a strain gauge, while being subjected to a circulating fluid such as hot air. The output of the weighing device, indicative of the amount of moisture present, is fed to a differential amplifier together with the output of a pressure sensor which, by measuring the pressure of the admitted fluid whose presence inside the chamber affects the apparent weight of the goods, introduces a corrective factor; when the amplifier output reaches a value indicative of a predetermined degree of dryness, a signal is actuated and/or a programmer responds to modify or terminate the drying operation.

---

Our present invention relates to an apparatus for the drying of wet-treated goods, such as, for example, yarns wound on spools preparatory to being placed in a drying chamber after having been subjected to a dyeing process.

In the automatic or semiautomatic operation of such installations it is desirable to provide means for reliably indicating the instant when the moisture content of the goods has been reduced to a predetermined level for the purpose of switching to a different mode of operation (say, from the admission of fresh drying air to recirculation over a closed path) or for terminating the process. The use of a simple timer will be satisfactory only where the same kind of goods are invariably subjected to the same initial degree of wetting; temperature measurements are also inexact as a guide and, besides, impose restrictions upon the amount of heat that can be employed for the treatment of dissimilar goods.

In the past there has been proposed a solution to this problem involving the weighing of the goods inside a drying chamber, the ascertained weight being a measure of the amount of moisture remaining on the goods. It has since become apparent that the sensitive pressure gauges advantageously used for this weighing operation are affected by the circulating drying fluid whose presence within the chamber thus tends to falsify the result. This is particularly true where a support for the goods inside the chamber is coupled with the weighing device through a stem passing outwardly by way of a membrane or the like forming a flexible seal, the membrane being subject to the fluid pressure prevailing inside the chamber. To a certain extent, however, this source of error makes itself felt also where the entire drying chamber is placed on the weighing scale, owing to the fact that the density of the air within the chamber may differ from that of the surrounding atmosphere.

It is, therefore, the object of our present invention to provide an improved system for reliably determining the true weight and, therefore, the presumed moisture content of wet-treated goods to be dried.

This object is realized, pursuant to our present invention, by the provision of pressure-sensitive means which, in combination with the aforedescribed weighing means, actuate a programmer, a signal lamp or some other indicator in response to a moisture-gauging signal from the weighing means and a corrective signal from the pressure-sensitive means for registering the attainment of the predetermined state of dryness of the goods. It will generally be sufficient to measure the static fluid pressure at the chamber inlet to ascertain the weighing error due to the existing pressure differential. If, as is the case with some automatically programmed drying installations, the direction of fluid flow is subjected to reversal, alternately operable sensors should be provided for the different inputs.

The invention will be described in greater detail with reference to the accompanying drawing the sole figure of which shows, somewhat diagrammatically, an apparatus for drying goods in accordance with our present improvement.

The apparatus shown in the drawing comprises a treatment chamber 1 in the form of a generally cylindrical vessel closed at the top by a lid 2 hinged at 3. A support for goods to be dried comprises a horizontal platform 4 with upstanding rods 5 on which spools 6 of bleached, dyed or otherwise wet-treated yarn may be removably mounted. Platform 4 has an axial stem 7 which passes outwardly through the chamber bottom in sealed relationship with a central nipple 8 for the admission or the withdrawal of a drying fluid, such as hot air; nipple 8 is connected through a flexible sleeve 9 coupling with a pipe 10 forming part of a conduit system which also includes a pipe 11 terminating in nipple 12 extending radially into the chamber 1. A flexible membrane 13 forms a fluidtight seal around nipple 8 near the bottom of the chamber while allowing for vertical displacement of the assembly 4–8, the weight of this assembly being determined by a weighing means 14, such as a strain gauge, upon which the support 4 bears through the lower end of its stem 7.

Branches 15, 16 of pipes 10, 11 lead to a pair of pressure sensors 17, 18 which derive electrical output signals from the static fluid pressure prevailing in these pipes. A four-way valve 19 enables either of these pipes to be connected to the high-pressure side of a conduit system 20 whose low-pressure side is then connected to the other pipe, the system further including a pump 21 for the circulation of drying air and a heater 22 for raising the temperature of the circulating fluid. Valves 23, 24, 25 are selectively operable, under the control of a programmer 26, to cause either fresh-air circulation or continuous recirculation, the fresh air being aspirated through a filter 27 in the open condition of valve 25 and being dischargeable, after traversing the chamber 1, into the atmosphere or to some other destination through an outlet 28 or an outlet 29, depending on the position of valve 23 and of a switching valve 30 also controlled by the programmer. In synchronism with the positioning of reversing valve 19, the programmer 26 selectively actuates the pressure sensor 17 or the pressure sensor 18 through a switch 31, according to whether the nipple 8 or the nipple 12 serves as the inlet for the admission of air into chamber 1.

The output of pressure gauge 14, converted into an electric voltage, is fed into one input of a differential amplifier 32 through a calibrating resistor 33, the other input of this amplifier receiving an output voltage from either of the two pressure sensors 17, 18 in accordance with the position of switch 31. The differential output of amplifier 32 is applied to a signaling device 34, such as a lamp or set of lamps, and to an input terminal of programmer 26. This programmer also receives information from a pair of temperature sensors 35, 36 contacting respective branches of conduit system 20.

Naturally, the pressure exerted upon gauge 14 by the vertically movable assembly 4–8 may be partly relieved by counterweights, springs or the like, not shown.

In operation, upon closure of the vessel 1 with the wet goods inside, the output of amplifier 32 may be present to a predetermined reference potential by means of resistor 33. Thereafter, the programmer 26 takes over the operation of the apparatus, controlling the preferably electric heater 22 in response to temperature gauges 35, 36 and switching between various types of fluid circulation in accordance with a predetermined program at times which may be at least partly determined by the attainment of a specified signal level in the output of amplifier 32. When this signal level indicates that a desired degree of final dryness has been reached, the system is switched off and the goods may be removed from the chamber 1.

Although but a single pressure gauge 14 has been illustrated, it will be understood that stem 7 could jointly bear upon several such gauges whose outputs would then be averaged; such averaging may, of course, also be utilized in conjunction with the pressure measured at 17 or 18. If the vessel 1 were to be made part of the movable system, a coupling similar to sleeve 9 would have to be inserted between a nipple 12 and pipe 11.

We claim:

1. An apparatus for continuously drying wet-treated goods, comprising a pressure-retaining drying chamber; support means in said chamber for holding said goods to be dried; circulating means for the passage of a drying fluid under pressure through said chamber; weighing means coupled with said support for determining the amount of moisture present on said good, said weighing means being affected by the fluid pressure in said chamber and producing a signal representing the apparent weight of said goods; pressure-sensitive means coupled with said circulating means for producing a corrective signal representing the effect of the presence of said fluid in said chamber upon the apparent weight of said goods; and indicator means connected to receive the signal from said weighing means and said corrective signal from said pressure-sensitive means for registering, by combining said signals, the attainment of a predetermined state of dryness by said goods.

2. An apparatus as defined in claim 1 wherein said indicator means includes a differential amplifier with respective inputs connected to the outputs of said weighing means and said pressure-sensitive means.

3. An apparatus as defined in claim 2 wherein said indicator means comprises a programmer responsive to said amplifier for controlling the operation of said circulating means.

4. An apparatus as defined in claim 1 wherein said circulating means includes an inlet conduit for said fluid, said pressure-sensitive means being connected with said inlet conduit.

5. An apparatus as defined in claim 4 wherein said circulating means further includes an alternate inlet conduit for said fluid and switchover means for passing said fluid through either of said conduits, said pressure-sensitive means comprising a pair of pressure-sensitive devices respectively connected with said conduits and selectively activable under the control of said switchover means.

6. An apparatus as defined in claim 1 wherein said chamber is provided with a flexible seal, said support means having a stem passing outwardly through said seal into operative engagement with said weighing means.

7. An apparatus as defined in claim 1 wherein said weighing means is a pressure gauge.

References Cited
UNITED STATES PATENTS

| | | | |
|---|---|---|---|
| 1,086,567 | 2/1914 | Stone | 34—54 |
| 3,233,334 | 2/1966 | Hamilton | 34—54 |

JOHN J. CAMBY, Primary Examiner